United States Patent [19]
Brahms et al.

[11] Patent Number: 4,926,305
[45] Date of Patent: May 15, 1990

[54] HAVING A PLURALITY OF SECONDARY WINDINGS

[75] Inventors: Martin Brahms, Hanover; Christian Prenner, Langenhagen, both of Fed. Rep. of Germany

[73] Assignee: Kabelmetal Electro GmbH, Hanover, Fed. Rep. of Germany

[21] Appl. No.: 312,026

[22] Filed: Feb. 17, 1989

[30] Foreign Application Priority Data

Feb. 22, 1988 [DE] Fed. Rep. of Germany ....... 3805460

[51] Int. Cl.$^5$ .......................................... H02M 3/335
[52] U.S. Cl. .......................................... 363/21; 363/97
[58] Field of Search ............ 363/21, 25, 26, 97, 363/131, 134

[56] References Cited

U.S. PATENT DOCUMENTS

| | | | |
|---|---|---|---|
| 3,524,124 | 8/1980 | Perkinson | 323/225 |
| 4,359,679 | 11/1982 | Regan | 363/26 |
| 4,439,722 | 3/1984 | Budnik | 323/225 |
| 4,468,722 | 8/1984 | Kammiller | 363/21 |
| 4,720,775 | 1/1988 | Cathell | 363/97 |

Primary Examiner—Patrick R. Salce
Assistant Examiner—Jeffrey Sterrett
Attorney, Agent, or Firm—James C. Jangarathis

[57] ABSTRACT

There is disclosed an improved method and apparatus for operating an electric power station including a cycled transformer having a primary winding and a plurality of secondary windings, in a manner that includes the changing of the current permeability of a variable load component connected in parallel to one of the secondary windings for preventing the current flowing within the circuitry thereof from decreasing below a predetermined value during a no-load condition at the output terminal of such secondary winding, thus assuring that the widths of the direct current pulses admitted into the primary winding are maintained above a predetermined value and that the energy transfer to each of the secondary windings is sufficient.

3 Claims, 1 Drawing Sheet

HAVING A PLURALITY OF SECONDARY WINDINGS

The invention related to method and apparatus for operating an electric power station including a cycled transformer to maintain output voltages at a plurality of output terminals.

BACKGROUND OF THE INVENTION

The transformation of electric loads by the admittance of direct current pulses into the primary winding of a transformer is priorly known. Such transformers are commercially available, and are known as "cycled transformers". Such cycled transformers are often employed as power suppliers to consumer circuits, for example, telecommunications equipments. In various applications of such cycled transformers, the voltage values provided on the secondary windings output terminals must be maintained within restricted tolerances or limits and, consequently, voltage regulation is indispensable. In known cycled transformers such regulation was usually provided to the secondary windings which were designed for handling the larger output terminal loads. More particularly, such regulation was provided by changing the width of the direct current pulses admitted into the primary windings of the cycled transformers in accord with the magnitude of the load connected to the output terminals of the regulated secondary windings.

The aforesaid regulation approach presented a problem to the prior art in that during the no-load condition of the regulated secondary windings only very narrow direct current pulses were admitted into the primary windings which resulted in satisfying only minimum energy transfers to the secondary windings. This often caused a breakdown in the voltage at the output terminals of the regulated secondary windings, as well as a breakdown of voltage at the output terminals of the other secondary windings, or at a minimum caused such output voltages to decrease below acceptable levels. To limit the consequences of such prior art problem, use limitations were stated on the various prior art cycled transformers as to the minimum load required for the output terminals of the regulated secondary windings. In other cases, the cycled transformers were limited to only one secondary winding each with concomitant expense and space requirements.

OBJECTS OF THE INVENTION

An object of the present invention is to provide a novel method and apparatus for operating an electric power station including a cycled transformer with a plurality of secondary windings which may be operated independent of the load condition associated with the secondary winding that is regulated.

Another object of the present invention is to provide a novel method and apparatus for operating a cycled transformer wherein a plurality of secondary windings are operational, notwithstanding a low-load or no-load condition as to the secondary winding of such plurality which determines the width of direct current pulses admitted into the primary winding.

Still another object of the present is to provide a novel method and apparatus for operating a cycled transformer having a plurality of secondary windings without being subject to restrictions as to low-load or no-load conditions on the output terminals of the secondary windings.

SUMMARY OF THE INVENTION

These and other objects of the present invention are achieved by a method and apparatus for operating an electric power station including a cycled, direct current, voltage transformer by changing the current permeability of a variable load component connected in parallel to a regulated one of a plurality of secondary windings. More particularly, the current permeability of such variable load component is changed in dependency upon the current flowing in the circuitry of the regulated secondary winding in a manner that such current does not decrease below a predetermined value. As a consequence of such variable load component, a minimum internal load condition is achieved in the circuit of the regulated secondary winding during a no-load condition at the output terminal of such secondary winding, and the widths of the direct current pulses admitted into the primary winding of the cycled transformer are maintained above a predetermined value. Thus, there is assured sufficient energy transfer to the secondary side of the transformer so that the secondary windings in addition to the regulated secondary winding are provided with the appropriate potentials.

BRIEF DESCRIPTION OF THE DRAWINGS:

A better understanding of the present invention as well as the objects and advantages thereof will become apparent upon consideration of the following detailed disclosure thereof, especially when taken with the accompanying drawings; wherein:

Referring to FIG. 1, a direct current, electric power station 1 includes an input terminal E on its primary side to which, by way of example, a 60 volt D.C. potential is applied. The secondary side of the electric power station 1 includes three output terminals A1, A2 and A3. By way of example, the output terminal A1 has a direct current potential of 95 volts; the output terminal A2 a direct current potential of +5 volts; and the output terminal A3 a direct current potential of −5 volts. The three output terminals A1, A2 and A3 are connectable to a plurality of consumer circuits V by way of a plurality of switches 2, 3 and 4. The direct current potential provided at the output terminal A1 is regulated by influencing the primary side, internally generated, direct current pulses of the electric power station 1. In accordance with the principals of the invention, the number of output terminals may be two or more. Of such plurality of output terminals only one such plurality of output terminals need be regulated. The output terminal which is designed for handling the heaviest load is preferably selected for such regulation.

In the exemplary embodiment, the voltage values at output terminals A1, A2 and A3 differ to a substantial degree. However, such voltages may differ in a less pronounce manner and, in specific cases, may have equal voltages at two or more output terminals.

Figure 1:
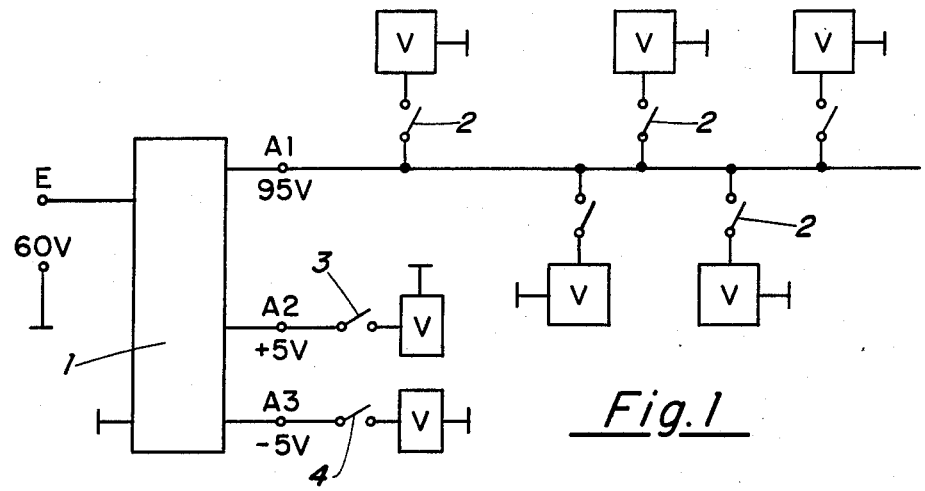
FIG. 1 is a block diagram of a direct current, electric power station connected to various consumer loads.
Figure 2:
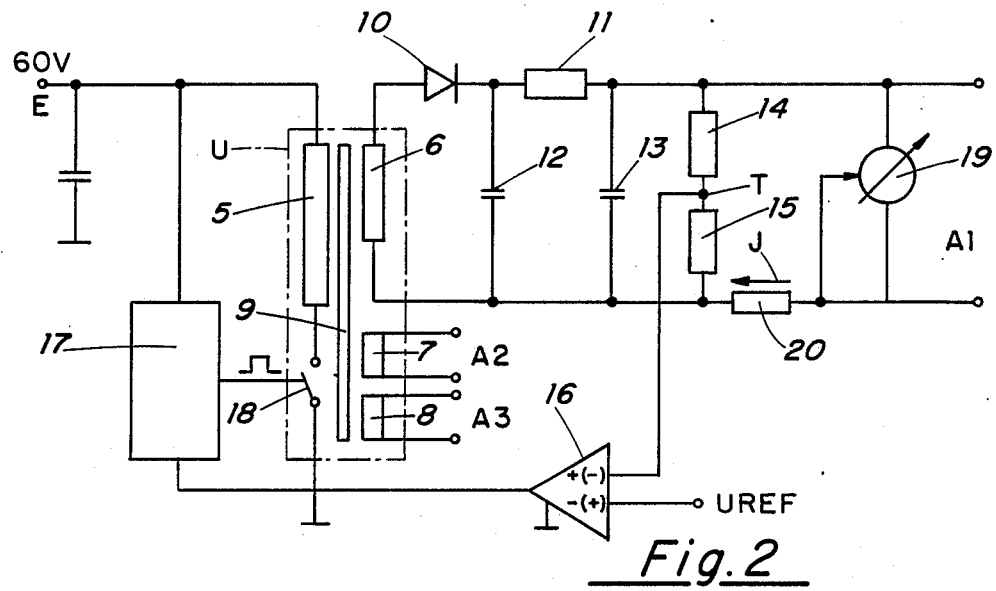
FIG. 2 is a circuit diagram of the electric power station of FIG. 1.
Figure 3:
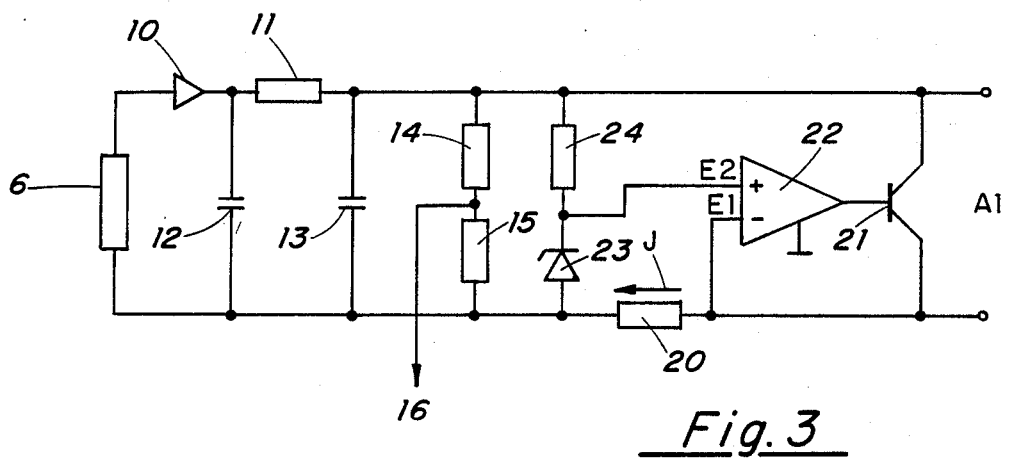
FIG. 3 is a circuit diagram of a portion of the electric power station of FIG. 1.

The circuitry of the direct current, electric power station 1, and its mode of operation will be understood from the following description with regard to FIGS. 2 and 3.

Referring to FIG. 2, the electric power station 1 comprises a cycled, direct current, voltage transformer U indicated within the dash-dot border lines. The transformer U includes a primary winding 5 and three secondary windings 6, 7 and 8. The direct current potential on output terminal A1 results from secondary winding 6, while the direct current potential on output terminal A2 results from secondary winding 7, and the direct current potential on output terminal A3 results from the secondary winding 8. Further, the transformer U includes a core 9. As only the direct current potential at output terminal A1 is regulated, only the secondary winding 6 with its associated circuitry is illustrated, the circuitry associated with the secondary windings 7 and 8 are not shown for simplicity.

The circuitry associated with the secondary winding 6 includes a rectifier 10 connected between one side of the secondary winding 6 and an impedance element 11. Connected on each side of the impedance element 11, and to the other side of the secondary winding 6 are two capacitors 12 and 13. Connected in parallel to the capacitor 13 is a voltage divider formed by a pair of serially connected resistors 14 and 15. A connection point T between the resistors 14 and 15 is connected to a first input terminal of a comparison circuit 16, which preferably functions as an operational amplifier. To a second input terminal of the comparison circuit 16 there is applied a reference, direct current, potential designated UREF. An output terminal of the comparison circuit 16 is in turn connected to a control circuit 17 from which cycled, direct current pulses are generated. The comparison circuit 16 drives the control circuit 17 in accord with the potential detected at the connection point T between the resistors 14 and 15, thereby controlling the width of the direct current pulses generated by the control circuit 17. A switch 18 connected in the circuit to ground of the primary winding 5, is connected to the control circuit 17 so as to have the time duration of its "open" and "closed" conditions dependent upon the width or time duration of such generated, direct current pulses. The switch 18 may, for example, comprise a standard type transistor. Depending upon the variations in the magnitude of the load condition at output terminal A1, the potential at the connection point T varies, resulting in a change in the width of the direct current pulses generated by the control circuit 17, which in turn varies the duration of energization of the primary winding 5, which in turn is translated to the secondary winding 6, as well as the secondary windings 7 and 8.

In order to prevent a breakdown of the voltage on the secondary windings 7 and 8 during a no-load condition at the output terminal A1, one side of a variable load device 19 is connected to output terminal A1, and the other side to a first side of a resistor 20. The second side of the resistor 20 is connected to the second side of the secondary winding 6. The current permeability of the variable load device 19 is dependent upon a current flow J through, and associated voltage drop across, the resistor 20. Upon current J passing through resistor 20 falling below a predetermined minimum value, the variable load device 19 becomes current permeable, resulting in a minimum load condition at the output terminal A1, and a current flow through the secondary winding 6, notwithstanding a no-load condition exists as to the plurality of consumer circuits V connectable to the output terminal A1. Such minimum load condition assures adequate energization of the transformer U, so that the secondary windings 7 and 8 are energized and the direct current potentials on the output terminals A2 and A3 are respectively maintained.

Referring to FIG. 3, the variable load device 19 schematically represented in FIG. 2 comprises a bipolar transistor 21 having one side of its current path connected to the output terminal A1 and the other side of such path connected to the first side of the resistor 20; a comparison circuit 22 having its output terminal connected to a base control electrode of the bipolar transistor 21 and its first input terminal E1 connected to the first side of the resistor 20; and a voltage divider comprising a serially connected Zener diode 23 and a resistor 24 connected between the output terminal A1 and the second side of the resistor 20, the Zener diode 23 having one side thereof connected to an input terminal E2 of the comparison circuit 22, whereby a voltage drop across the resistor 20 is applied to the input terminal E1, and the Zener diode 23 applies a reference potential to the input terminal E2.

The operation of the circuit depicted in FIG. 3 is as follows:

As long as sufficient load is provided to at least one of the plurality of consumer circuits V connected to the output terminal A1, a current of sufficient magnitude passes through the resistor 20 so that the voltage drop thereacross, which is applied to the input terminal E1 of the comparison circuit 22, causes the bipolar transistor 21 to retain an impermeable condition. Upon a decrease in the load connected to the output terminal A1, the current passing through the resistor 20 decreases, and the voltage drop across such resistor applied to input terminal E1 of comparison circuit 22 decreases. Consequently, the output potential of the comparison circuit 22 applied to the base control electrode of the bipolar transistor 21 increases, rendering such transistor permeable. Such potential is so adjusted that the current that passes through the current path of bipolar transistor 21 cannot decrease beyond a predetermined value. In the "no-load condition" (i.e., no consumer circuit V connected to the output terminal A1), the current path of the bipolar transistor 21 conducts the total minimum current through the resistor 20. The minimum value of such current is determined by the resistance value of the resistor 20 so as to cause a corresponding voltage drop for properly influencing the comparison circuit 22. Such minimum current corresponds to a minimum load condition at the output terminal A1 that assures adequate energization of the transformer U, so that the secondary windings 7 and 8 are energized and the direct current potentials on the output terminals A2 and A3 are maintained.

While the invention has been described in connection with an exemplary embodiment thereof, it will be understood that many modifications will be apparent to those of ordinary skill in the art and that this application is intended to cover any adaptations or variations thereof. For example, though a bipolar transistor 21 is described with respect to the circuit of FIG. 3, a field effect transistor, in particular, a MOSFET transistor may be used. Therefore, it is manifestly intended that the invention be only limited by the claims and equivalents thereof.

What is claimed is:

1. Method for operating an electric power station including a cycled, direct current, voltage transformer having a primary winding with an input terminal, and at least a first secondary winding with a first output terminal and a second secondary winding with a second output terminal, comprising the steps of:

applying a direct current potential to said input terminal;

admitting direct current pulses to said primary winding from a direct current source;

sensing the voltage across said first output terminal;

regulating the width of said direct current pulses in dependency upon said sensed voltage for regulating the voltage of said first output terminal; and regulating the current permeability of a transistor having its current path in parallel to said first output terminal, said transistor having its control electrode connected to an output terminal of a comparison circuit having a first input terminal thereof connected to a reference voltage source and being controlled in response to a voltage drop across an impedance element disposed in the circuit of said first secondary winding, said transistor assuming an impermeable condition as long as said first secondary winding has a sufficient load connected thereto, and assuming a permeable condition in the absence of said sufficient load so that said voltage drop is so adjusted that the current through said current path of said transistor does not decrease below a predetermined value.

2. An electric power station including a cycled, directed current, voltage transformer having a primary winding with an input terminal, and at least a first secondary winding with a first output terminal and a secondary winding with a second output terminal comprising means for applying a direct current potential to said input terminal;

means for admitting direct current pulses to said primary winding from a direct current source;

means for sensing the voltage across said first output terminal;

means for regulating the width of said direct current pulses in dependency upon said sensed voltage for regulating the voltage at said first output terminal;

means for regulating the current permeability of a transistor connected with its current path in parallel to said first output terminal, said transistor having its control electrode connected to an output terminal of a comparison circuit having a first input terminal thereof connected to a reference voltage source and being controlled in response to a voltage drop across an impedance element disposed in the circuit of said first secondary winding, said transistor assuming an impermeable condition as long as said first secondary winding has a sufficient load connected thereto, and assuming a permeable condition in the absence of said sufficient load so that said voltage drop is so adjusted that the current through said current path of said transistor does not decrease below a predetermined value.

3. An electric power station in accordance with claim 2, wherein said first secondary windings is desinged for handling the largest of the output terminal loads.

* * * * *

UNITED STATES PATENT AND TRADEMARK OFFICE
CERTIFICATE OF CORRECTION

PATENT NO. : 4,926,305

DATED : May 15, 1990

INVENTOR(S) : Martin Brahms and Christian Prenner

It is certified that error appears in the above-identified patent and that said Letters Patent is hereby corrected as shown below:

On the title page, item [54] and in column 1, lines 2 and 3, the title of the invention "HAVING A PLURALITY OF SECONDARY WINDINGS" should be change to:

--OPERATION OF A CYCLED TRANSFORMER HAVING A PLURALITY OF SECONDARY WINDINGS--.

Signed and Sealed this

Ninth Day of July, 1991

*Attest:*

HARRY F. MANBECK, JR.

*Attesting Officer*  *Commissioner of Patents and Trademarks*